United States Patent Office 3,652,616
Patented Mar. 28, 1972

3,652,616
ADDITIVES FOR FUELS AND LUBRICANTS
Roger W. Watson, Highland, Ind., William T. Brannen, Jr., Westlake, Ohio, and Warren W. Hillstrom, Bel Air, Md., assignors to Standard Oil Company, Chicago, Ill.
No Drawing. Filed Aug. 14, 1969, Ser. No. 850,244
Int. Cl. C07f 11/00, 15/00, 7/28
U.S. Cl. 260—429 R
8 Claims

ABSTRACT OF THE DISCLOSURE

Disclosed are compositions prepared by (a) reacting a hydrocarbon-substituted succinic anhydride and an alkylene polyamine having the formula $H_2N$ (-alkylene-$NH)_nH$, where $n$ is an integer from about 1 to about 12 and "alkylene" is a saturated divalent hydrocarbon having from about 1 to about 10 carbon atoms; and (b) reacting the material formed in step (a) with a reactant having an available metal atom capable of being sequestered. These compositions are useful as fuel and lubricant additives.

BACKGROUND OF THE INVENTION

If metallic materials are mixed with fuels or lubricants, engine wear is sometimes inhibited. However, since most metallic materials are not soluble in fuels or lubricants, they cannot be added directly to the fuel or lubricant but must be treated to render them soluble. This treatment must not materially impair the anti-wear activity of the metal.

DESCRIPTION OF THE INVENTION

We have discovered compositions which are especially good anti-wear agents, although they also exhibit good dispersancy and anti-corrosion activities. These compositions are thus highly useful as additives for fuels and lubricants. Because of the complexity of the reactions between the various reagents used in the preparation of these compositions, they are best characterized by the way they are prepared, which is as follows:

Preparation

First a hydrocarbon-substituted succinic anhydride and an alkylene polyamine are reacted by heating a mixture of these reagents at a temperature preferably ranging between about 200 and about 350° F. Heating is continued until the water of condensation ceases to evolve. A one-half to 4-hour heating period is usually sufficient for this purpose. The amounts of anhydride and polyamine used can vary, and are dependent on the number of reactive nitrogen atoms there are in the polyamine. For example, we can use enough polyamine so that there will be available between about 1 and about 5 reactive nitrogen per anhydride molecule. Generally, from about 0.25 to about 1.0 moles of the polyamine are used per mole of the anhydride. The reaction product of the anhydride and polyamine is an intermediate which serves as a sequestering agent. This intermediate product is a mixture of compounds, but we believe the predominant species present is a succinimide. This sequestering agent is reacted with a material containing a metal atom capable of being sequestered. The amounts of sequestering agent and metallic material used can also vary, and are also dependent on the number of reactive nitrogens present. For example, we can use enough agent so that there will be available one reactive nitrogen per metal atom, or we can use a greater amount so that there will be available ten reactive nitrogens per one metal atom. The sequestering reaction is sometimes aided by blending the sequestering agent and metal-containing material in a cosolvent, and then heating and vigorously agitating the reaction mix. The reaction mix is preferably heated for just a few seconds to several hours, e.g. 10 hours, at a temperature preferably ranging between about 100 to about 400° F., most preferably about 150–200° F.

Reagents

Hydrocarbon-substituted succinic anhydride: The hydrocarbon-substituted succinic anhydride is prepared by mixing together and heating maleic anhydride and an olefin or olefin polymer. The anhydride's hydrocarbon substituent, which is generally an alkenyl group having 6 or more carbon atoms, imparts oil-solubility to the compositions of our invention. Hydrocarbon substituents of the anhydrides may be prepared using olefin polymers having a molecular weight between about 500 and about 5,000, and they may also contain other groups, as for example, chloro, bromo, nitro, alkoxy, or phenoxy radicals. The preferred hydrocarbon substituents are derived from olefins or olefin polymers of a monomer or monomers such as propylene, butylene, isobutylene, butadiene, isoprene and cyclopentadiene. The most preferred hydrocarbon substituents are polypropenyl and polybutenyl groups.

Alkylene polyamine: Suitable alkylene polyamines generally come within the formula $H_2N$ (-alkylene-$NH)_nH$, where $n$ is an integer from about 1 to about 12, and alkylene is a saturated divalent hydrocarbon containing from about 1 to about 10 carbon atoms. The preferred alkylene polyamines are ethylene and propylene polyamines, the most preferred being tetraethylene pentamine. Other polyamines include, for example, butylene polyamines, and cyclic homologues of such polyamines, for example, piperazines. Specific examples of alkylene polyamines are ethylene diamine, hexamethylene diamine, diethylene triamine, triethylene tetramine, pentaethylene tetramine, and N-2-aminoethyl-piperazine.

Metallic materials: Suitable metal-containing materials are (1) metal salts of carboxylic acids; (2) metal thiocyanates; (3) complex acids having the formula $H_aMX_b$, where M is a metal, X is a coordinate ligand such as $CN^-$, $SCN^-$ or $Cl^-$, $a$ is the sum of ligand valences minus the valence of the metal, and $b$ is the coordination state of the metal; (4) alkali metal or alkaline earth metal salts of the complex acid of (3); and (5) metal oxides or sulfides. Examples of metal salts of carboxylic acids are zinc acetate, zinc formate, zinc dimethyldithiocarbamate, nickel formate, nickel acetate and manganese acetate. Generally, lower molecular weight acid salts containing from about 1 to about 5 carbon atoms are preferred. Examples of metal thiocyanates are $Co(SCN)$, $Fe(SCN)_3$, $Ni(SCN)_2$, $Cu(SCN)$, $Cu(SCN)_2$ and $Fe(SCN)_3$. Examples of complex acids are $H_4Fe(CN)_6$ and $H_3Co(CN)_6$. Examples of metal salts of the complex acids are $K_3Cr(SCN)_6$ and $Na_3Cr(SCN)_6$. Examples of metal oxides and sulfides are nickel and copper oxides and sulfides. Preferred metallic materials contain metal ions from the transition series such as zinc, copper, nickel, cobalt, iron, manganese, chromium, vanadium, titanium, molybdenum, silver, cadmium, tungsten, or mercury.

Cosolvent: It sometimes is necessary to use a cosolvent to solubilize the anhydride, polyamine, and/or metallic material. Thus, to facilitate the preparation of the compositions of this invention, in some instances, water, methyl or ethyl alcohol, tetrahydrofuran, dimethyl sulfoxide, dimethyl ether of diethylene glycol (diglime), 2-ethoxyethanol (cellosolve), dioxane, or dimethyl formamide may be used as a cosolvent.

DESCRIPTION OF THE PREFERRED EMBODIMENTS

Embodiment A

Embodiment A employs the metal salt of a carboxylic acid as the metal-containing material. Compositions prepared using these metal salts, when blended with lubricants in amounts ranging from about 0.05 to 10 weight percent, provide dispersancy and inhibit wear, oxidation, sulfur corrosion and rusting of engine parts.

Example 1A

First prepare a bis-succinimide intermediate by reacting 2 moles of polybutenyl-substituted succinic anhydride with 1 mole of tetraethylene pentamine. The molecular weight of this intermediate is about 2200. Next mix 7.2 g. of zinc acetate and 100 g. of the intermediate, heat the mix at 250° F. for about 2 hours, and then add to the reaction mix diatomaceous earth and filter.

Examples 2A–6A

These examples correspond to Example 1A with the exception that, in place of the zinc acetate, react the following reagents with the polybutenyl succinimide:

| Example | Reagent | Amount, grams |
| --- | --- | --- |
| 2A | Zinc formate | 8.0 |
| 3A | Zinc dimethyldithiocarbamate | 15.0 |
| 4A | Nickel formate | 8.0 |
| 5A | Nickel acetate | 8.0 |
| 6A | Manganese acetate | 8.0 |

Compositions made in accordance with the above examples were clear solutions which did not exhibit any precipitation upon standing for several months. Infrared studies indicate that the carboxylic acids are still attached to the metal. Analyses of these compositions reveal the following metal contents:

| Example | Percent metal |
| --- | --- |
| 1A | 1.49 |
| 2A | 1.22 |
| 3A | 0.11 |
| 4A | 0.51 |
| 5A | 0.63 |
| 6A | 0.62 |

The following lubricating materials using the metal-free intermediate as an additive or additives of embodiment A were prepared and tested. As illustrated in Table I, bench and engine tests demonstrate the superiority of the additives of embodiment A over the metal-free intermediate additives. A zinc dialkyl dithiophosphate inhibitor (ZOP) was, in some cases, added to the test lubricant. Since these ZOP compounds are very good corrosion inhibitors, it is desirable that anti-wear agents be compatible with ZOP inhibitors. The additives of our invention have this desideratum.

| Lubricating Material IA: | Parts by weight |
| --- | --- |
| SAE 30 mineral oil | 94.8 |
| Metal-free intermediate | 5.0 |
| ZOP | 1.2 |
| Lubricating Material IIA: | |
| SAE 30 mineral oil | 94.8 |
| Additive of Example 4A | 5.0 |
| ZOP | 1.2 |
| Lubricating Material IIIA: | |
| SAE 30 mineral oil | 94.8 |
| Additive of Example 2A | 5.0 |
| ZOP | 1.2 |
| Lubricating Material IVA: | |
| SAE 30 mineral oil | 98.0 |
| Metal-free intermediate | 2.0 |
| Lubricating Material VA: | |
| SAE 30 mineral oil | 98.0 |
| Additive of Example 1A | 2.0 |
| Lubricating Material VIA: | |
| SAE 30 mineral oil | 98.0 |
| Additive of Example 2A | 2.0 |
| Lubricating Material VIIA: | |
| SAE 30 mineral oil | 98.0 |
| Additive of Example 4A | 2.0 |

TABLE I

Sulfur corrosion test

| Lubricating material: | Sulfur corrosion,[1] (10=perfect) |
| --- | --- |
| IA | 4.0 |
| IIA | 8.0 |

[1] Oldsmobile lifters heated in test lubricant at 300° F. for 16 hours.

Steel falex test (wear test)

| Lubricating material: | Jaw load at failure, lbs. |
| --- | --- |
| IVA | 1250 |
| VA | 1750 |
| VIA | 1750 |
| VIIA | 1750 |

L-38 engine test

| Lubricating material: | Bearing weight, loss, mg. |
| --- | --- |
| IA | 279 |
| IIA | 56 |
| IIIA | 58 |

Embodiment B

Embodiment B employs metal thiocyanates as the metal-containing material. In particular we propose using thiocyanates of any metal in the first transition series; molybdenum, silver, and cadmium from the second transition series; tungsten and mercury from the third transition series; tin; and lead. Additives made in accordance with this embodiment can be added to fuels such as gasoline in amounts ranging from about .0001 to about 0.5 weight percent, preferably about .005 weight percent. As fuel additives they are useful as octane improvers, pre-ignition inhibitors, antioxidants, diesel smoke inhibitors, and wear inhibitors. These compositions can also be added to lubricants in amounts ranging from about 0.1 to about 10 weight percent, preferably about 0.50 weight percent. In lubricants, they improve dispersancy and inhibit wear, oxidation, sulfur corrosion and rusting.

Example 1B

First mix 375 g. of SAE 30 oil and 375 g. of the reaction product (polybutenyl succinimide intermediate) of 2 moles polybutenyl-substituted succinic anhydride and 1 mole of tetraethylene pentamine. Then dilute this mix with 750 g. of heptane, heat the diluted mix to 150° F., and add 60 g. of cobalt thiocyanate and 200 ml. of ethyl alcohol. Hold at this temperature for one hour and then heat to 250° F. to remove solvents. Lastly, filter off excess salt.

Examples 2B through 6B

These examples correspond to Example 1B with the exception that in place of the cobalt thiocyanate, react the following reagents with the polybutenyl succinimide intermediate.

| Example | Reagent | Amount, grams |
| --- | --- | --- |
| 2B | $Fe(SCN)_3$ | 60.0 |
| 3B | $Ni(SCN)_2$ | 60.0 |
| 4B | $Cu(SCN)$ | 60.0 |
| 5B | $Cu(SCN)_2$ | 60.0 |
| 6B | $Fe(SCN)_3$ | 30.0 |

Example 7B

First mix 375 g. of SAE 30 oil and 375 g. of the reaction product of 1 mole of polybutenyl succinic anhydride and 1 mole of tetraethylene pentamine. Then dilute this mix with 750 g. of heptane, heat the diluted mix to 150° F., and add 80 g. of $Fe(SCN)_3$ and 200 ml. of ethyl alcohol. Hold at this temperature for one hour and then heat to 250° F. to remove solvents. Lastly filter the product.

X-ray fluorescence analysis of compositions prepared in accordance with Examples 1B–7B indicated that these compositions have the following metal contents:

| Example | Percent metal |
|---|---|
| 1B | 1.9 |
| 2B | 1.6 |
| 3B | 3.1 |
| 4B | 0.49 |
| 5B | 0.59 |
| 6B | 0.79 |
| 7B | 1.28 |

The following lubricating materials using metal-free intermediate as an additive or additives of embodiment B were prepared and tested. As illustrated in Table II, the tests demonstrate the superiority of the additives of embodiment B over the metal-free intermediate:

Lubricating Material IB: Parts by weight
   SAE 30 mineral oil _____ 95.0
   Metal-free intermediate _____ 5.0
Lubricating Material IIB:
   SAE 30 mineral oil _____ 95.0
   Additive of Example 2B _____ 5.0
Lubricating Material IIIB:
   SAE 30 mineral oil _____ 95.0
   Additive of Example 7B _____ 5.0
Lubricating Material IVB:
   SAE 30 mineral oil _____ 95.0
   Additive of Example 1B _____ 5.0
Lubricating Material VB:
   SAE 30 mineral oil _____ 95.0
   Additive of Example 6B _____ 5.0

TABLE II

Steel falex test (wear test)

| Lubricating material: | Jaw load at failure, lbs. |
|---|---|
| IB | 1500 |
| IIB | 1750 |
| IIIB | 1750 |
| IVB | 3000 |
| VB | 2750 |

STIRRING SAND CORROSION TEST

| Lubricating material: | Copper-lead bearing, wt. loss after 72 hrs., mg. | Acidity |
|---|---|---|
| IB | 1,313 | 16.8 |
| IIB | 1,387 | 15.4 |
| IIIB | 546 | 13.2 |
| IVB | 95 | 3.9 |

Embodiment C

Embodiment C employs complex metal acids as the metal-containing material. In particular we purpose using $H_4Fe(CN)_6$ and $H_3Co(CN)_6$. Compositions prepared using these complexing agents serve both as fuel and lubricant additives. They can be added to fuels and lubricants in the same amounts as indicated in Embodiments A and B, and they also have essentially the same properties as Embodiments A and B.

Example 1C

First, prepare a bis-polybutenyl succinimide intermediate by reacting in a 50% oil solution 2 moles of the anhdyride and 1 mole of tetraethylene pentamine. Second, dilute 100 g. of this intermediate with 200 g. of heptane and heat to 150° F. Third, add to the reaction mix 10 g. of ferrocyanic acid, $H_4FE(CN)_6$, and 40 ml. of ethyl alcohol, hold at 150° F. for 1 hour, and then heat to 170° F. and hold at this temperature for 1¾ hours. Finally, filter the reaction mix and evaporate the solvent under vacuum.

Example 2C

This example is essentially the same as Example 1C except use cobaltic-cyanic acid, $H_3Co(CN)_6$, in place of the ferrocyanic acid.

Example 3C

This example is essentially the same as Example 1C except use an intermediate prepared from 1 mole of tetraethylene pentamine and 1 mole of polybutenyl succinic anhydride in place of the bis-polybutenyl succinimide intermediate.

Example 4C

This example is essentially the same as Example 1C except use an intermediate prepared from 1 mole of tetraethylene pentamine and 2 moles of dodecenyl-succinic anhydride in place of the bis-polybutenyl succinimide intermediate.

X-ray fluoroescence analysis of compositions prepared in accordance with these examples indicated the compositions have the following metal contents:

| Example: | Percent metal |
|---|---|
| 1C | 1.02 |
| 2C | 0.63 |
| 3C | 1.46 |
| 4C | 1.4 |

The following lubricating materials were made and tested. Results are presented in Table III.

Lubricating Material IC: Percent by weight
   SAE 30 mineral oil _____ 95.0
   Metal-free intermediate _____ 5.0
Lubricating Material IIC:
   SAE 30 mineral oil _____ 95.0
   Additive of Example 1C _____ 5.0
Lubricating Material IIIC:
   SAE 30 mineral oil _____ 95.0
   Additive of Example 2C _____ 5.0
Lubricating Material IVC:
   SAE 30 mineral oil _____ 95.0
   Additive of Example 3C _____ 5.0
Lubricating Material VC:
   SAE 30 mineral oil _____ 95.0
   Additive of Example 4C _____ 5.0

TABLE III

Steel falex test (wear test)

| Lubricating material: | Jaw load at failure, lbs. |
|---|---|
| IC | 1500 |
| IIC | 1750 |
| IIIC | 2250 |
| IVC | 1500 |

STIRRING SAND CORROSION TEST

| Lubricating material: | Copper-lead bearing, wt. loss after 72 hrs., mg. | Acidity |
|---|---|---|
| IC | 1,313 | 16.8 |
| IIC | 774 | 16.8 |
| IIIC | 66 | 2.2 |
| IVC | 596 | 16.8 |
| VC | 1,318 | 14.6 |

Embodiment D

Embodiment D employs as the metal-containing material alkali or alkaline earth salts of the complex acids of Embodiment C. Potassium and sodium salts are preferred. Compositions prepared using these salts are useful as fuel and lubricant additives as previously described in connection with Embodiments A through C.

Example D

First, dilute with 100 ml. of heptane, 500 g. of a 50% oil solution of the bis-succinimide intermediate prepared in Example 1A. Heat this diluted mix to 150° F., add 50 g. of potassium hexathiocyanate chromate (III), and then add 150 ml. of ethyl alcohol. Hold the reaction mix at 150° F. for 1 hour, then heat to 250° F. and hold at this temperature until substantially all the solvents are removed. Finally, filter the mix. X-ray analysis of a composition prepared in accordance with this Example D indicates a metal content of 0.80% chromium.

One interesting aspect in the preparation of this complex is that the chromium in $K_3Cr(SCN)_6$ already has a complete coordination sphere. When reacted with the intermediate, coordination of the metal with amine groups occurs. Thiocyanate ligands seem to be displaced from the coordination sphere, coming out of solution as potassium thiocyanate. The product has a potassium content of 0.78%, corresponding to a little more than one potassium per chromium while the initial ratio was 3 to 1. It is also possible that some KSCN remains dispersed in the solution. Thus, the succinimide appears to displace thiocyanate ligands from the coordination sphere.

The following lubricating materials were prepared and tested:

| Lubricating Material ID: | Percent by weight |
|---|---|
| SAE 30 mineral oil | 95.0 |
| Metal-free intermediate | 5.0 |
| Lubricating Material IID: | |
| SAE 30 mineral oil | 95.0 |
| Additive of Example D | 5.0 |

Steel falex test (wear test)

| Lubricating material: | Jaw load at failure, lbs. |
|---|---|
| ID | 1500 |
| IID | 2500 (average) |

Embodiment E

Embodiment E employs as the metal-containing material metal oxides or sulfides. Composition prepared using these oxides and sulfides are also fuel and lubricant additives.

Example 1E

In 200 g. of light catalytic cycle oil, mix together 200 g. of the bis-succinimide intermediate of Example 1A, 200 g. of dimethyl formamide, and 60 g. of copper (II) oxide. Heat this reaction mix for 5 hours at 150° F. and then remove the solvents by heating to 360° F. Lastly, filter.

Example 2E

This example is essentially the same as Example 1E except use nickel sulfide in place of the copper (II) oxide.

We claim:
1. A composition prepared by:
(a) forming an intermediate by reacting a hydrocarbon-substituted succinic anhydride and an alkylene polyamine having the formula $H_2N$

(-alkylene-NH)$_n$H where $n$ is an integer from about 1 to about 12 and "alkylene" is a saturated divalent hydrocarbon having from about 1 to about 10 carbon atoms, said polyamine and anhydride being reacted in relative proportions such that enough of the polyamine is used so that between about 1 and about 5 reactive nitrogens are present per molecule of anhydride; and
(b) reacting the intermediate formed in step (a) with a reactant having a metal atom capable of being sequestered, and said intermediate and metal-containing reactant being reacted in relative proportions such that enough of the intermediate is used so that between about 1 and about 10 reactive nitrogens are present per atom of metal, said metal-containing reactant being selected from the group consisting of metal thiocyanates, complex acids having the formula $H_aMX_b$, wherein M is a metal, X is a coordinate ligand selected from the group consisting of CN— or SCN—, $a$ is the sum of ligand valences minus the valence of the metal, and $b$ is the coordination state of the metal, and alkali or alkaline earth metal salts of said complex acids.

2. The composition defined in claim 1 wherein the hydrocarbon substituent of the anhydride has 6 or more carbon atoms.

3. The composition defined in claim 2 wherein the hydrocarbon substituent of the anhydride has a molecular weight between about 500 and about 5000.

4. The composition defined in claim 3 wherein the hydrocarbon substituent is a polypropenyl or polybutenyl group.

5. The composition defined in claim 1 wherein the alkylene polyamine is tetraethylene pentamine.

6. The composition defined in claim 1 wherein the metal of the thiocyanate is cobalt, iron, nickel, or copper.

7. The composition defined in claim 1 wherein the complex acid is ferrocyanic acid or cobaltic-cyanic acid.

8. The composition defined in claim 1 wherein the metal-containing reactant is potassium or sodium hexathiocyanate chromate (III).

References Cited

UNITED STATES PATENTS

| 2,699,427 | 1/1955 | Smith et al. | 252—33.6 |
| 3,306,908 | 2/1967 | Le Suer | 260—326.3 |

FOREIGN PATENTS

| 1,085,903 | 10/1967 | Great Britain. |

OTHER REFERENCES

Moeller Inorganic Chemistry, John Wiley and Sons, New Yorn, N.Y. 1952, pp. 463–464.

Cotton et al., Advanced Inorganic Chemistry Interscience Publishers, New York, N.Y., 1962, pp. 526-8.

JAMES E. POER, Primary Examiner

A. P. DEMERS, Assistant Examiner

U.S. Cl. X.R.

44—68, 71; 252—46.7, 49.7; 260—429 J, 429.5, 429.9, 430, 431, 438.1, 438.5 R, 439 R